US012657013B2

(12) United States Patent
Chan et al.

(10) Patent No.: US 12,657,013 B2
(45) Date of Patent: Jun. 16, 2026

(54) APPARATUSES, METHODS, AND COMPUTER PROGRAM PRODUCTS FOR OUTPUTTING PROCESS TIME INSIGHT INTERFACE COMPONENTS IN CONNECTION WITH A GROUP SHARED CODE REPOSITORY

(71) Applicants: Atlassian PTY Ltd, Sydney (AU); ATLASSIAN US, INC., San Francisco, CA (US)

(72) Inventors: Victor Jing Chuan Chan, Sydney (AU); Steven Michael Prentice, Port Macquarie (AU)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 241 days.

(21) Appl. No.: 17/809,303

(22) Filed: Jun. 28, 2022

(65) Prior Publication Data

US 2023/0418577 A1 Dec. 28, 2023

(51) Int. Cl.
| | |
|---|---|
| *G06F 8/41* | (2018.01) |
| *G06F 11/34* | (2006.01) |
| *G06N 20/00* | (2019.01) |

(52) U.S. Cl.
CPC .......... *G06F 8/443* (2013.01); *G06F 11/3419* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,970,636 | B1 * | 4/2021 | Elwell ................. | G06F 11/3688 |
| 2021/0055995 | A1 * | 2/2021 | Biernacki ........... | G06F 11/1417 |

* cited by examiner

*Primary Examiner* — Lewis A Bullock, Jr.
*Assistant Examiner* — Mark A Gooray
(74) *Attorney, Agent, or Firm* — Alston & Bird LLP

(57) ABSTRACT

Apparatus, methods, and computer program products for providing a client device of a group shared code repository with insights into code processing periods associated with code processing operations on the group shared code repository are provided. An example apparatus includes at least one processor and at least one memory including program code, configured to cause the apparatus to at least: detect a code process request triggering a code processing operation associated with the group shared code repository; initiate a code processing operation monitoring module to identify a code processing period associated with the code processing operation; receive the process time insight interface component generated based on the code processing period; and render the process time insight interface component to an insight interface associated with the group shared code repository.

19 Claims, 7 Drawing Sheets

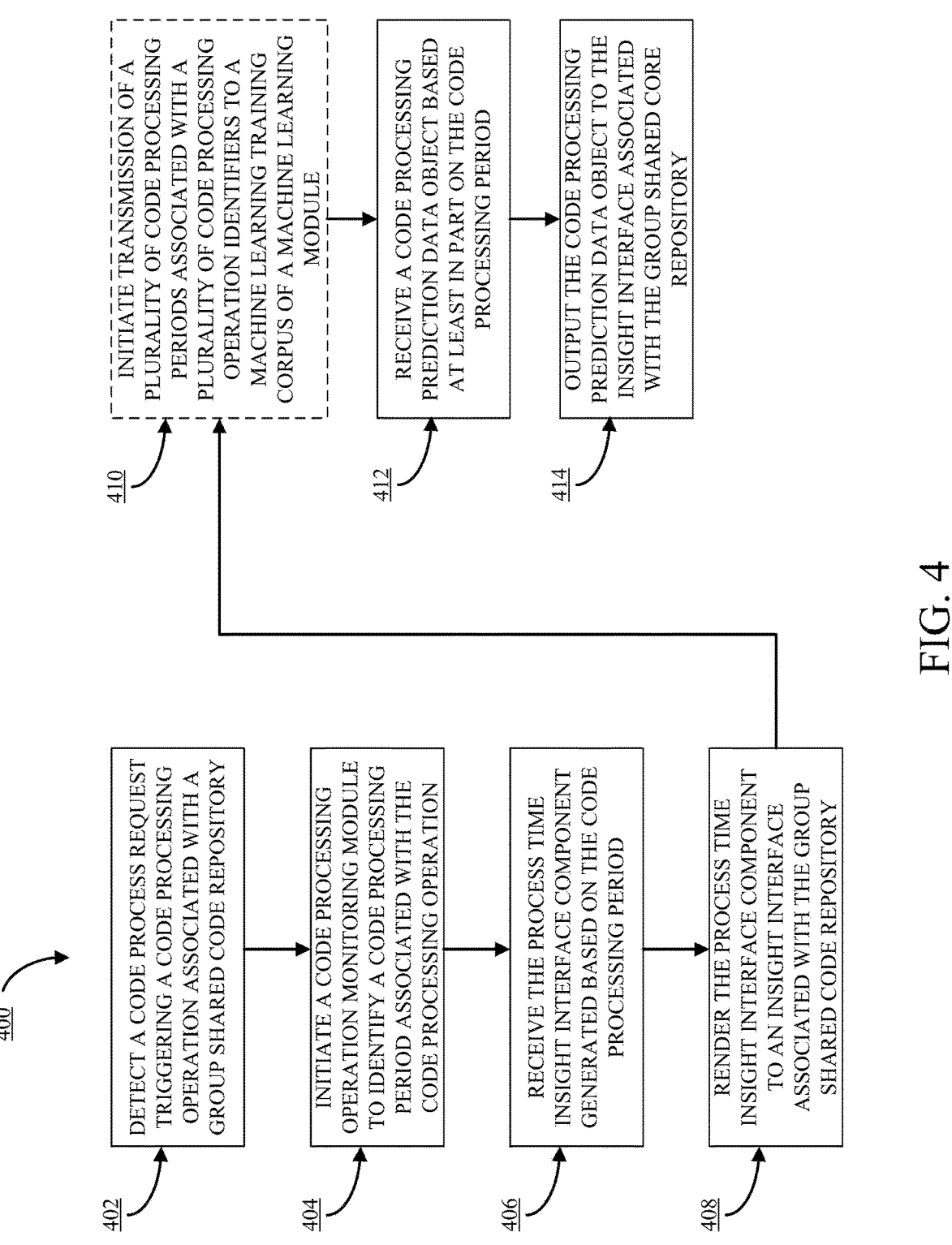

400

402 DETECT A CODE PROCESS REQUEST TRIGGERING A CODE PROCESSING OPERATION ASSOCIATED WITH A GROUP SHARED CODE REPOSITORY

404 INITIATE A CODE PROCESSING OPERATION MONITORING MODULE TO IDENTIFY A CODE PROCESSING PERIOD ASSOCIATED WITH THE CODE PROCESSING OPERATION

406 RECEIVE THE PROCESS TIME INSIGHT INTERFACE COMPONENT GENERATED BASED ON THE CODE PROCESSING PERIOD

408 RENDER THE PROCESS TIME INSIGHT INTERFACE COMPONENT TO AN INSIGHT INTERFACE ASSOCIATED WITH THE GROUP SHARED CODE REPOSITORY

410 INITIATE TRANSMISSION OF A PLURALITY OF CODE PROCESSING PERIODS ASSOCIATED WITH A PLURALITY OF CODE PROCESSING OPERATION IDENTIFIERS TO A MACHINE LEARNING TRAINING CORPUS OF A MACHINE LEARNING MODULE

412 RECEIVE A CODE PROCESSING PREDICTION DATA OBJECT BASED AT LEAST IN PART ON THE CODE PROCESSING PERIOD

414 OUTPUT THE CODE PROCESSING PREDICTION DATA OBJECT TO THE INSIGHT INTERFACE ASSOCIATED WITH THE GROUP SHARED CORE REPOSITORY

FIG. 4

APPARATUSES, METHODS, AND COMPUTER PROGRAM PRODUCTS FOR OUTPUTTING PROCESS TIME INSIGHT INTERFACE COMPONENTS IN CONNECTION WITH A GROUP SHARED CODE REPOSITORY

TECHNOLOGICAL FIELD

Embodiments of the present disclosure relate generally to apparatuses, methods, and computer program products for measuring and reducing computational process times and compiling latencies associated with software code repositories.

BACKGROUND

Conventional systems for managing a software code repository suffer from many deficiencies and problems related to processing times and compiling latencies. Through applied effort, ingenuity, and innovation, these identified deficiencies and problems have been solved by developing solutions that are configured in accordance with the embodiments of the present disclosure, many examples of which are described in detail herein.

BRIEF SUMMARY

Various embodiments are directed to an example apparatus, method, and computer program product for providing a client repository device of a group shared code repository with insights into code processing periods associated with code processing operations on the group shared code repository.

In accordance with some embodiments of the present disclosure, an example apparatus configured for rendering a process time insight interface component in a group shared code repository is provided. In some embodiments, the apparatus may comprise at least one processor and at least one memory including program code, the at least one memory and the program code configured to, with the at least one processor, cause the apparatus to at least: detect a code process request triggering a code processing operation associated with the group shared code repository; initiate a code processing operation monitoring module to identify a code processing period associated with the code processing operation; receive the process time insight interface component generated based on the code processing period; and render the process time insight interface component to an insight interface associated with the group shared code repository.

In some embodiments, the code processing operation may comprise compiling all or part of the group shared code repository, recompiling all or part of the group shared code repository, indexing all or part of the group shared code repository, and/or any combination thereof.

In some embodiments, a code processing prediction data object may be generated based at least in part on the code processing period and may be output to the insight interface associated with the group shared code repository.

In some embodiments, the code processing prediction data object may identify one or more code repository object identifiers and/or code processing operation identifiers adversely affecting system performance.

In some embodiments, the code processing prediction data object may be determined based at least in part on the output of a code processing prediction machine learning module comprising a code processing prediction machine learning training corpus trained with a plurality of code processing periods associated with a plurality of code repository object identifiers and/or code processing operation identifiers.

In some embodiments, the code processing period may represent an elapsed time while performing the code processing operation.

In some embodiments, the process time insight interface component may comprise a code-change-to-build-time insight interface component, a type-system-setup-time insight interface component, and/or a branch-build-time insight interface component.

An example method for rendering a process time insight interface component in a group shared code repository is further included. In some embodiments, the example method may comprise: detecting a code process request triggering a code processing operation associated with the group shared code repository; initiating a code processing operation monitoring module to identify a code processing period associated with the code processing operation; receiving the process time insight interface component generated based on the code processing period; and rendering the process time insight interface component to an insight interface associated with the group shared code repository.

In some embodiments, the code processing operation may further comprise compiling all or part of the group shared code repository, recompiling all or part of the group shared code repository, indexing all or part of the group shared code repository, and/or any combination thereof.

In some embodiments, the code processing prediction data object may be generated based at least in part on the code processing period.

In some embodiments, the code processing prediction data object may be output to the insight interface associated with the group shared code repository.

In some embodiments, the code processing prediction data object may identify one or more code repository object identifiers and/or code processing operation identifiers adversely affecting system performance.

In some embodiments, the code processing prediction data object may be determined based at least in part on the output of a code processing prediction machine learning module comprising a code processing prediction machine learning training corpus trained with a plurality of code processing periods associated with a plurality of code repository object identifiers and/or code processing operation identifiers.

In some embodiments, the code processing period may represent an elapsed time while performing the code processing operation.

An example computer program product for rendering a process time insight interface component in a group shared code repository is also included. In some embodiments, the computer program product may comprise at least one non-transitory computer-readable storage medium having computer-readable program code portions stored therein. The computer-readable program code portions may comprise an executable portion configured to: detect a code process request triggering a code processing operation associated with the group shared code repository; initiate a code processing operation monitoring module to identify a code processing period associated with the code processing operation; receive the process time insight interface component generated based on the code processing period; and render the process time insight interface component to an insight interface associated with the group shared code repository.

In some embodiments, the code processing operation may further comprise compiling all or part of the group shared code repository, recompiling all or part of the group shared code repository, indexing all or part of the group shared code repository, and/or any combination thereof.

In some embodiments, the code processing prediction data object may be generated based at least in part on the code processing period and output to the insight interface associated with the group shared code repository.

In some embodiments, the code processing prediction data object may identify one or more code repository object identifiers and/or code processing operation identifiers adversely affecting system performance.

In some embodiments, the code processing prediction data object may be determined based at least in part on the output of a code processing prediction machine learning module comprising a code processing prediction machine learning training corpus trained with a plurality of code processing periods associated with a plurality of code repository object identifiers and/or code processing operation identifiers.

In some embodiments, the code processing period may represent an elapsed time while performing the code processing operation.

BRIEF DESCRIPTION OF THE FIGURES

Having thus described certain example embodiments of the present disclosure in general terms, reference will now be made to the accompanying drawings. The components illustrated in the figures may or may not be present in certain embodiments described herein. Some embodiments may include fewer (or more) components than those shown in the figures.

Figure 1:
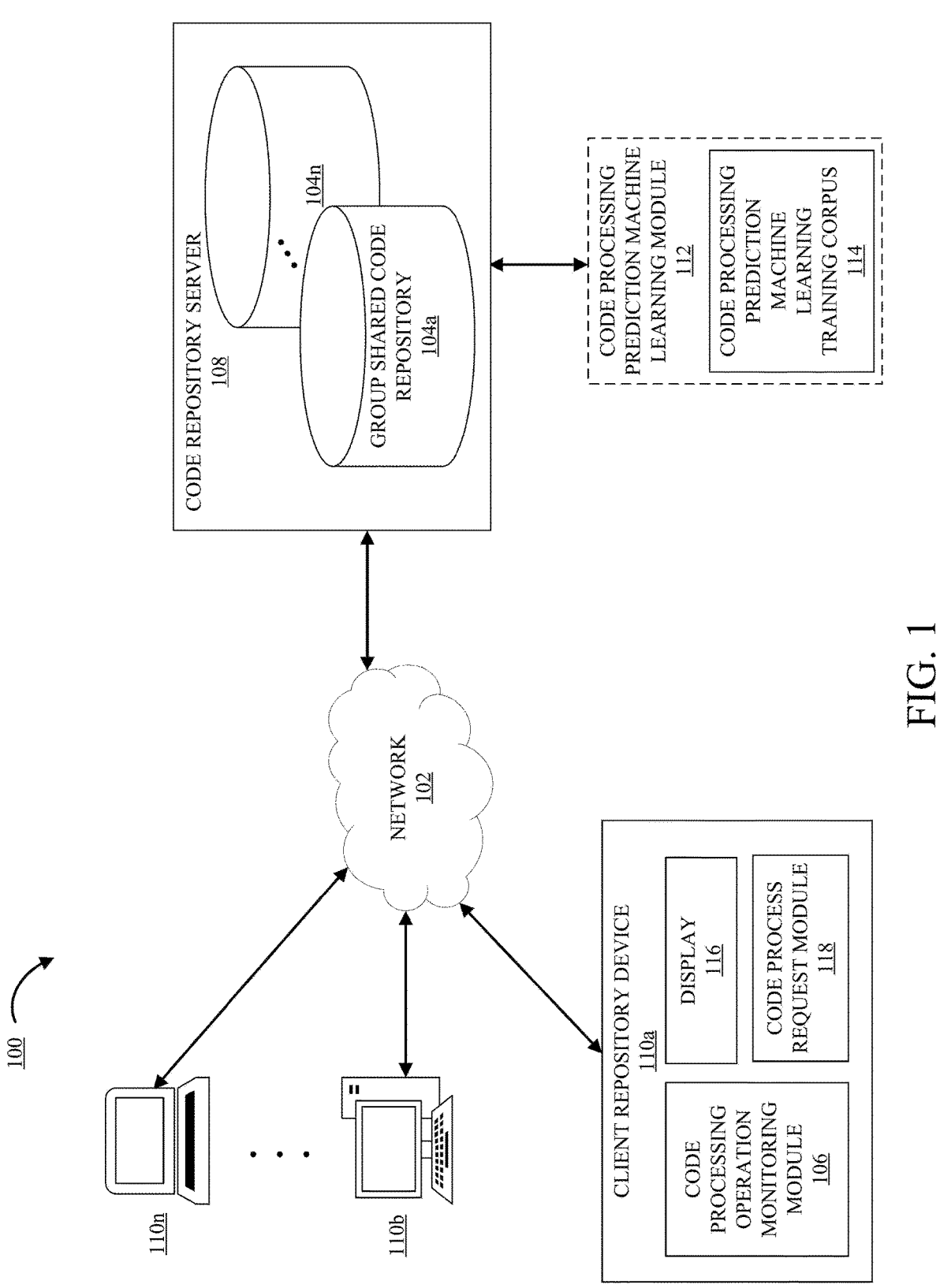

FIG. 1 illustrates a block diagram of an example group shared code development framework within which one or more embodiments of the present disclosure may operate.

Figure 2A:
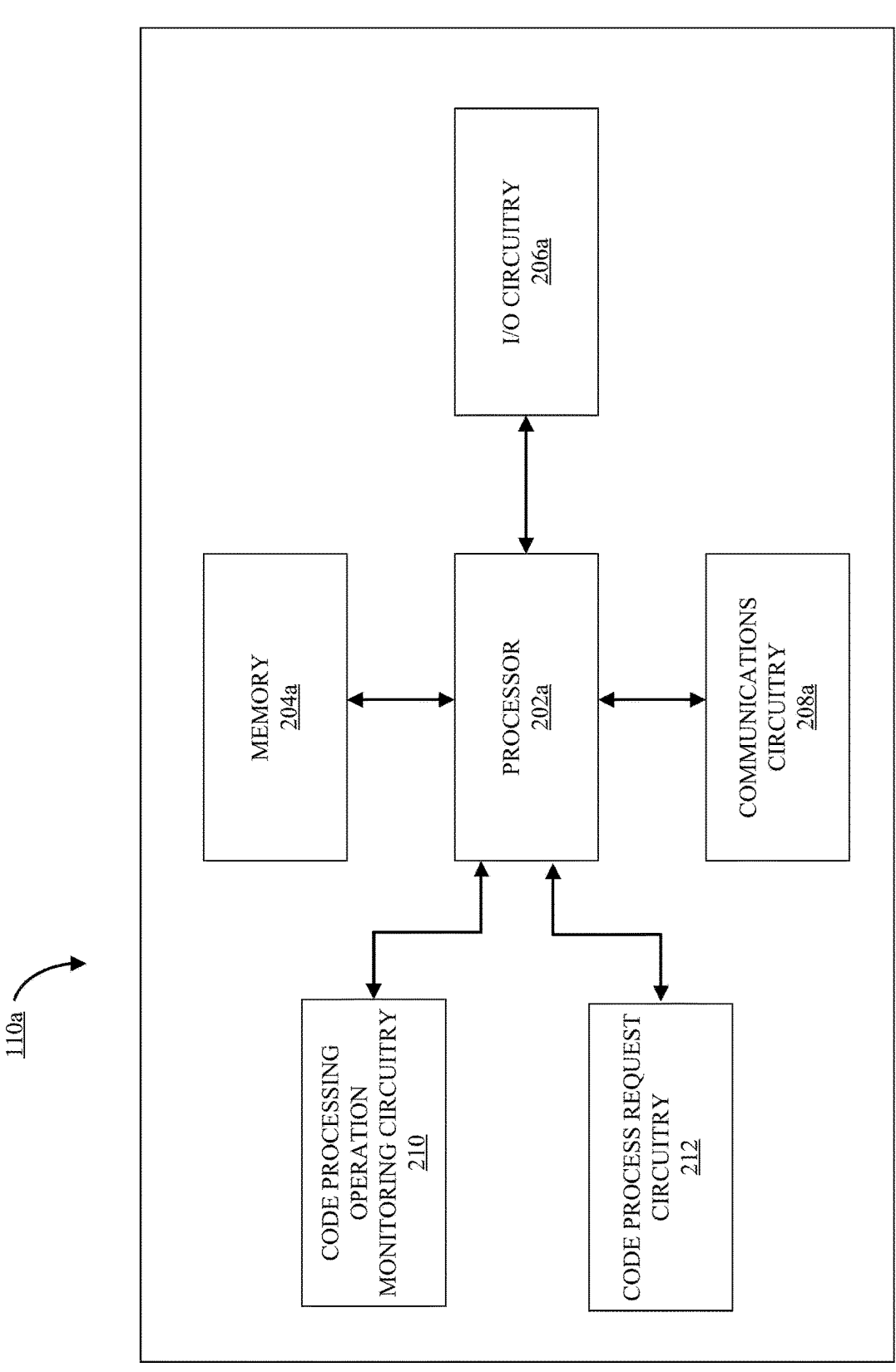

FIG. 2a illustrates a block diagram of an example client repository device within which one or more embodiments of the present disclosure may operate.

Figure 2B:
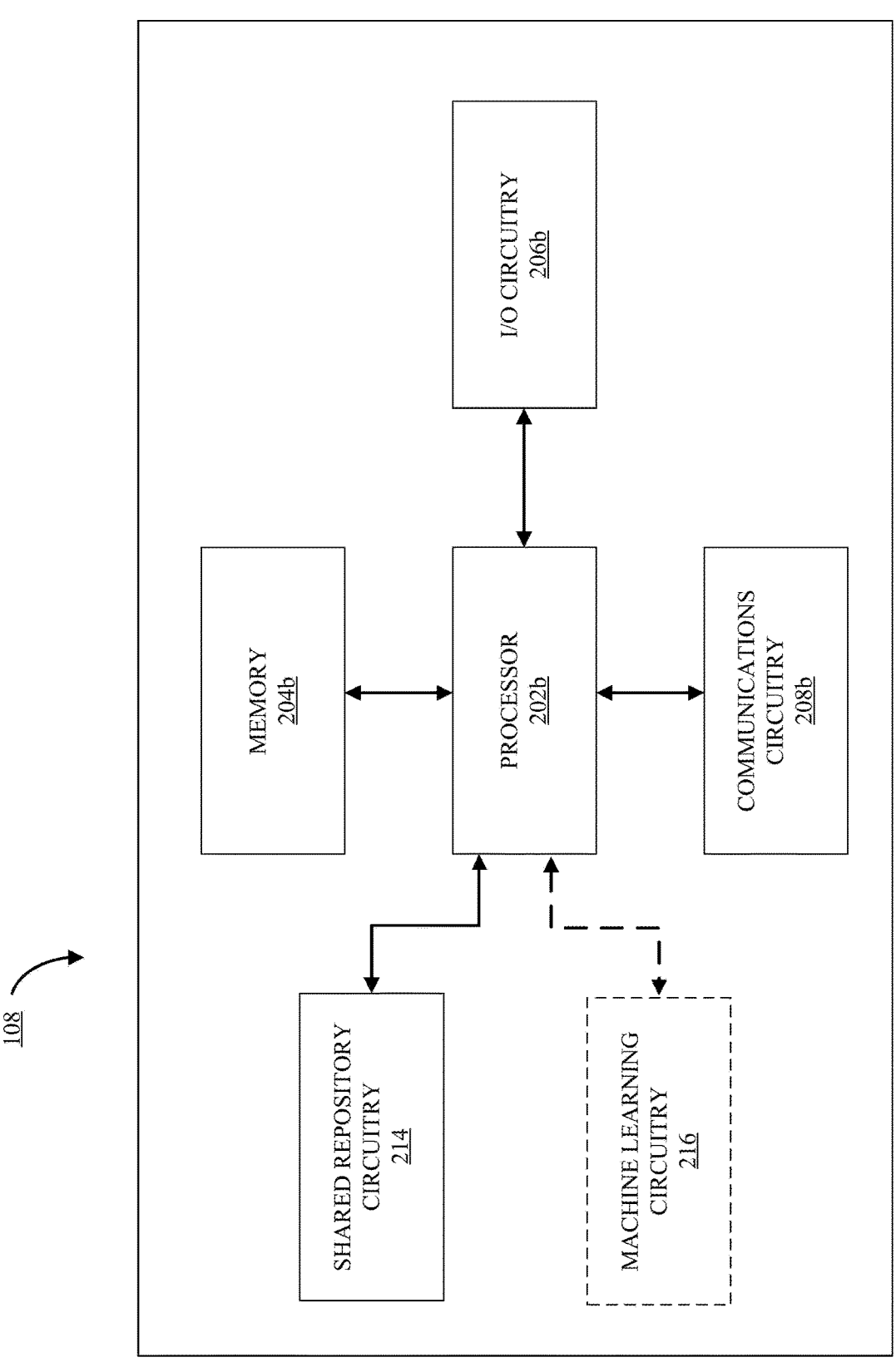

FIG. 2b illustrates a block diagram of an example code repository server within which one or more embodiments of the present disclosure may operate.

Figure 3:
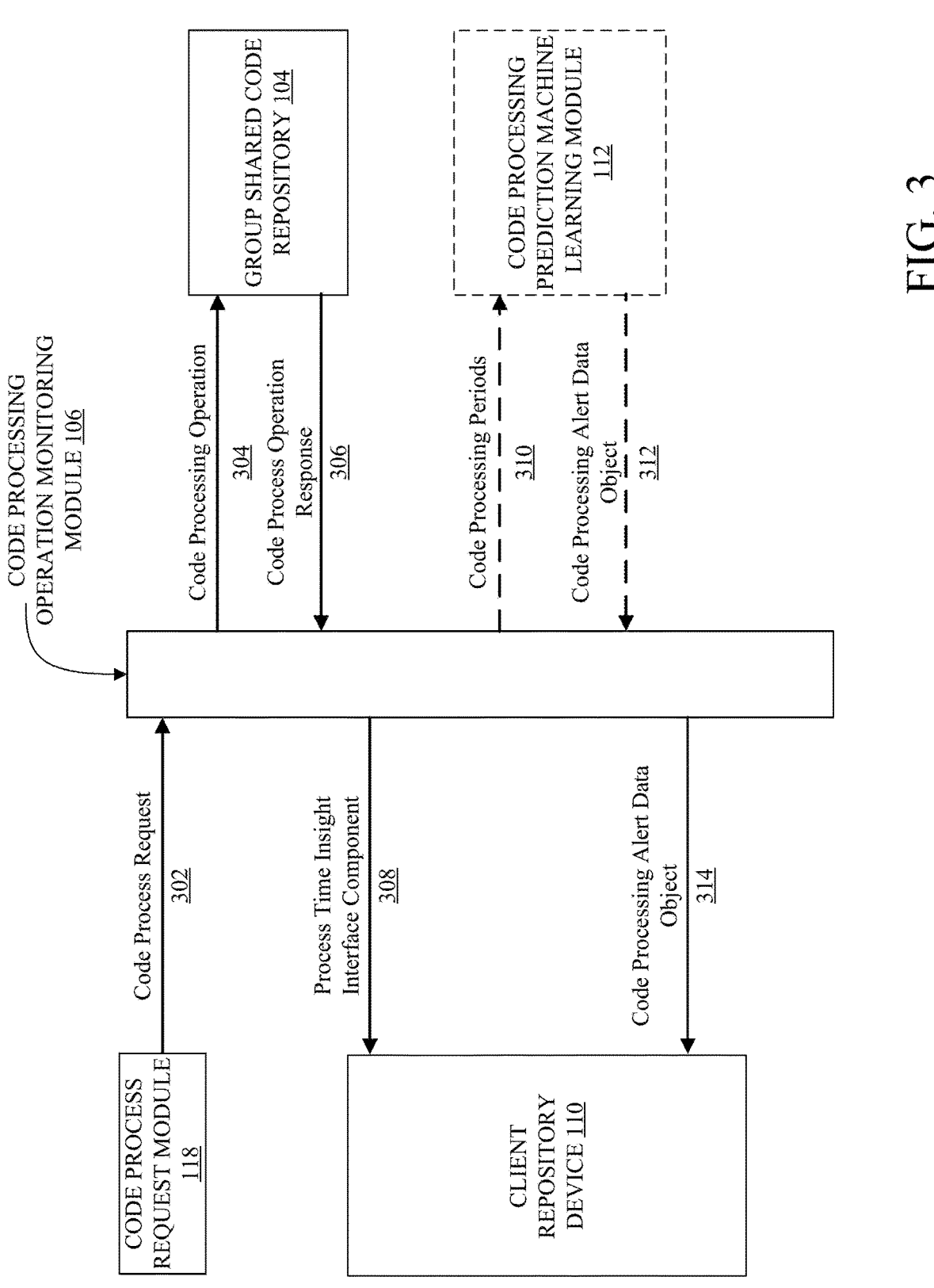

FIG. 3 illustrates a signal diagram of an example process for generating code process interface components in response to code process requests in accordance with one or more embodiments of the present disclosure.

FIG. 4 illustrates a flowchart of example operations for measuring a code processing period in accordance with one or more embodiments of the present disclosure.

Figure 5:
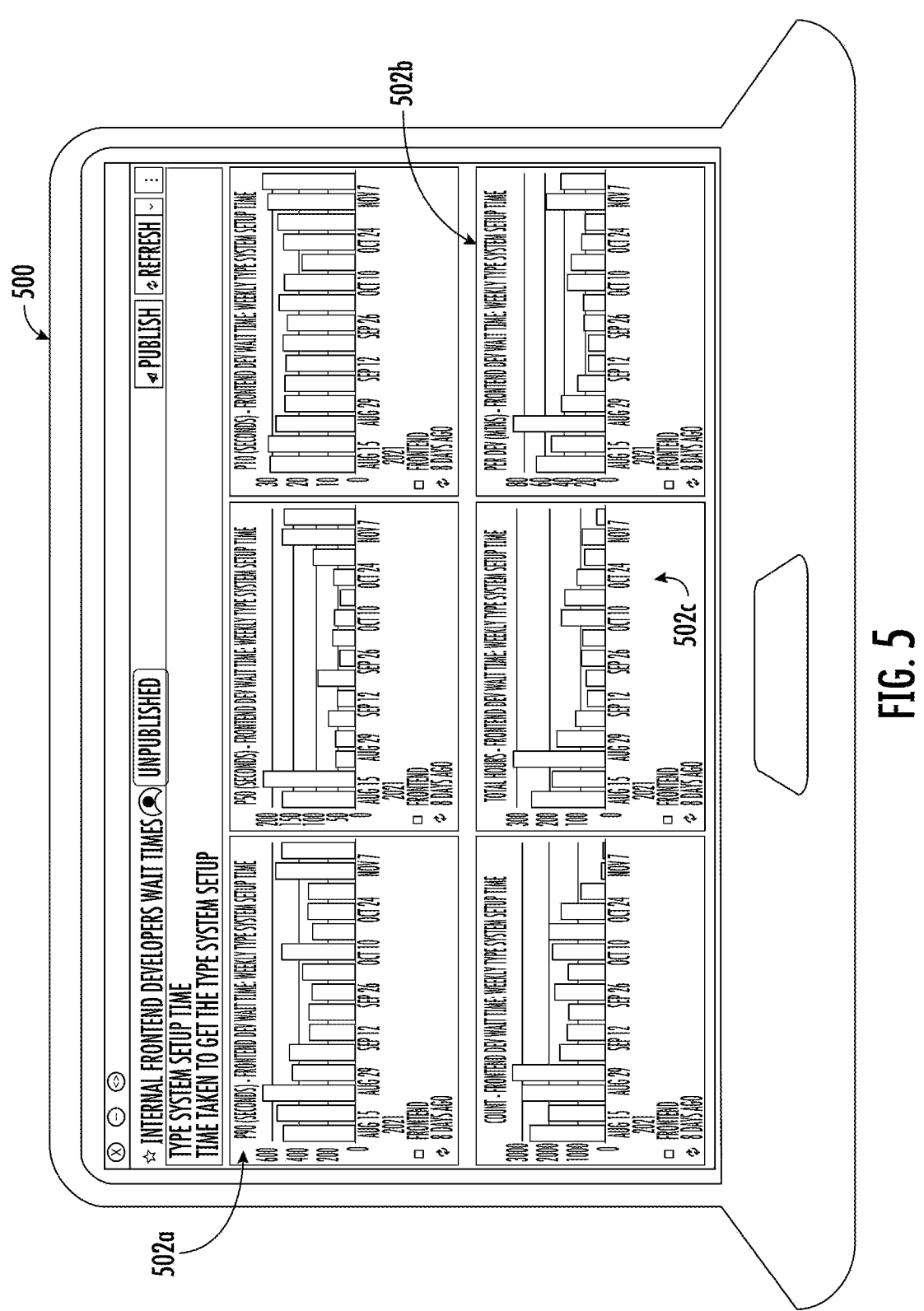

FIG. 5 illustrates an example process time insight interface configured in accordance with one or more embodiments of the present disclosure.

Figure 6:
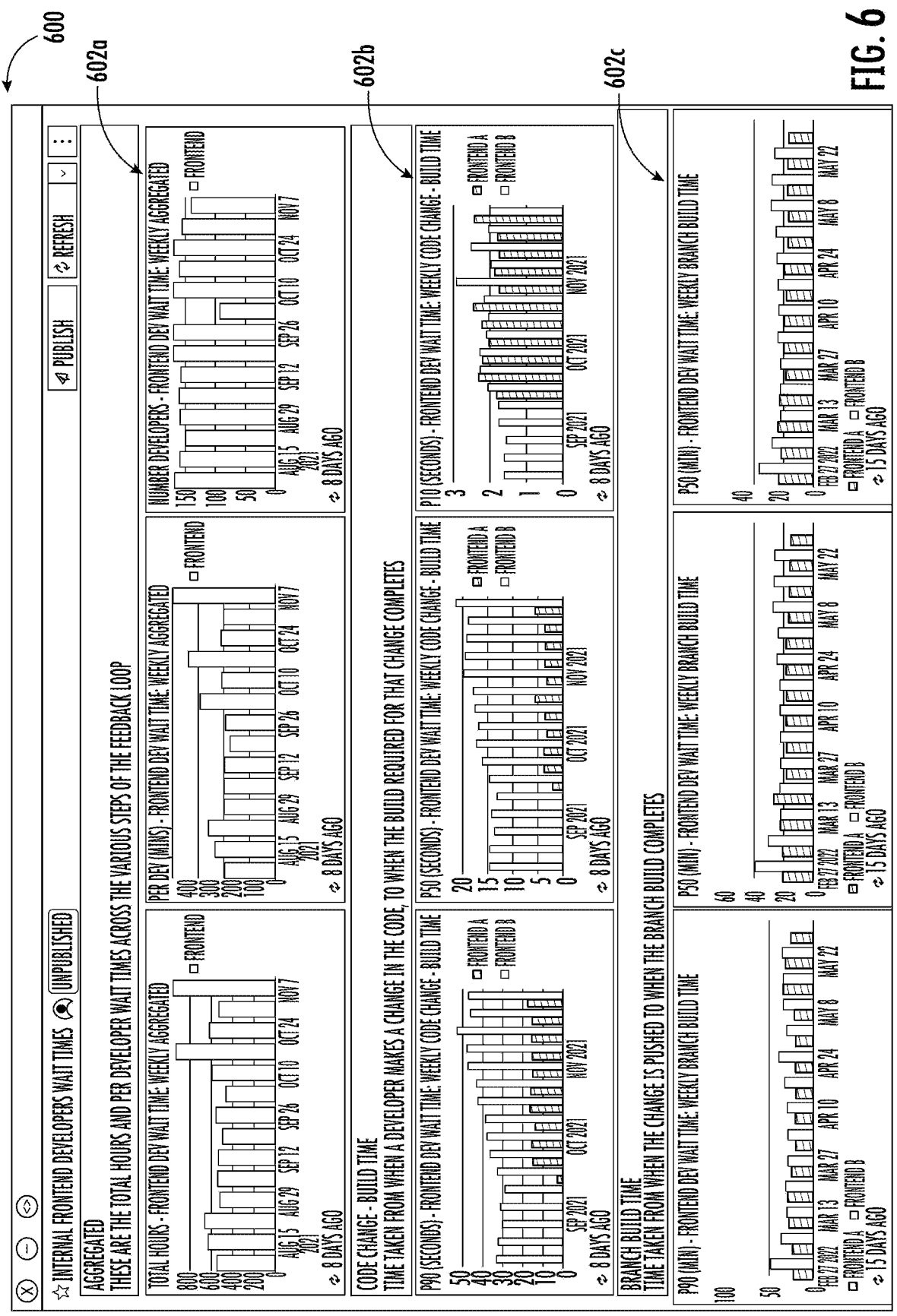

FIG. 6 illustrates an example process time insight interface configured to display aggregated data in accordance with one or more embodiments of the present disclosure.

DETAILED DESCRIPTION

Embodiments of the present disclosure now will be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with determining and mitigating extensive code process operation times related to a group shared code repository. The disclosed techniques may be utilized by a code repository server to provide insights into various code processing periods associated with the development, maintenance, and storage of code by a group shared code repository. These insights can be used by a user or organization to reduce unnecessary downtime in code development and release due to code processing operations; alert users of potential bottlenecks in the code processing cycle; and/or otherwise provide visibility into code processing operations to facilitate improvements in the efficiency of code production and deployment.

In general, a code repository server typically stores source code, files, libraries, and other objects (collectively referred to as "repository objects") generated and utilized in the development of software code. A variety of client devices and users may access, modify, and maintain the various repository objects. As part of the code development cycle, a number of operations are performed on the various repository objects. For example, a code repository server may index managed files, libraries, etc.; link files and libraries; compile source files and libraries; run static analysis; run linting tools; run system tests; and perform other code processing operations beneficial to the management of production code and the code deployment process.

In some instances, code processing operations are initiated by a user. For example, if a user elects to build a code project on a code repository server in preparation for testing or deployment of a software product. In other instances, code processing operations may be initiated automatically by the code repository server or a client repository device. For example, if a user of a client repository device uploads or updates a file on the repository; if the client repository device or the code repository server initiates a unit test; or any other process or event that automatically generates a code processing operation on the code repository server.

Many code processing operations can consume large amounts of development time. For example, a developer may be dependent on the latest build of a group shared code repository in order to test code changes. Often a code developer's progress is slowed or even stopped while awaiting the completion of certain code processing operations. Typically the code repository server provides no indication of the time consumed by the various code processing operations during code production in isolation or in the aggregate. In addition, code repository servers typically provide no indication or warning of the time a particular code processing operation may take to complete.

This problem is compounded when multiple developers simultaneously write, update, release, and/or otherwise process code stored to a common code repository (referenced and defined herein as a "group shared code repository"). The repository may queue or hold code processing operations of a first developer until code processing operations of other developers are completed. In some instances, developers may have to deal with textual or semantic merge conflicts as a result of co-developing. If multiple developers undertake code processing operations in parallel, such queues, holds, or merges can cause significant delays and processing latencies.

As illustrated above, without accurate measurement, automated tracking, and visual display of the operation times of various code processing operations, code development processes and associated code repository systems suffer from significant technical problems and inefficiencies. These problems are exacerbated as the number of clients with access to the repository increases, the size of the code project managed on the code repository server increases, and/or the number of client repository devices modifying the files on the code repository server increases. The present disclosure provides methods, apparatus, and computer program products that accurately measure and report various code processing periods associated with the management of a code repository server. These process times can be recorded and reported for isolated requests, or in the aggregate. The code processing periods may also be compartmentalized by individual code processing operations, and/or code repository objects or groups of objects. The described apparatuses, methods, and computer program products may result in improved efficiency in the management of a code repository server and overall improvements in the code development cycle.

Definitions

The terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

A "computer-readable storage medium," which refers to a physical storage medium (e.g., volatile or non-volatile memory device), may be differentiated from a "computer-readable transmission medium," which refers to an electromagnetic signal.

The terms "user", "client", and/or "request source" refer to an individual or entity that is a source, and/or is associated with sources, of a request for messages and/or related content to be provided by a message objective control system and/or any other system capable of providing messages and/or related content to the individual and/or entity. For example, a "user" and/or "client" may be the owner and/or entity that seeks information and options associated with preparing and/or otherwise planning for one or more potential events.

The term "database," "resource," and/or similar terms used herein interchangeable may refer to a collection of records or data that is stored in a computer-readable storage medium using one or more database types. The term "database type" may refer to a type of database, such as a hierarchical database, network database, relational database (e.g., Aurora, RDS), entity-relationship database, object database (e.g., S3), document database, semantic database, graph database, non-SQL database (e.g., DynamoDB), and/or the like.

The term "process time insight interface component" refers to a data construct and associated instructions that are determined to indicate a code processing period associated with a code processing operation. A process time insight interface component is determined by a code processing operation monitoring module hosted, for example, by a client repository device, a code repository server, and/or another similar apparatus. The process time insight interface component includes data and instructions that are configured for rendering an insight interface to a display of a client device.

Non-limiting examples of process time insight interface components include a code-change-to-build-time insight interface component, a type-system-setup-time insight interface component, a branch-build-time insight interface component, and other insight interface components representing similar code processing periods. A code-change-to-build-time insight interface component may, in some embodiments, represent the elapsed time from the time a developer makes a change to a file, object, or library on a group shared code repository until the corresponding files, objects, and/or libraries have been updated and built, such that the code is ready for testing and/or deployment. A type-system-setup-time insight interface component may, in some embodiments, represent the elapsed time from the time a file or object is opened, until the time associated types are generated necessary for further code development. A branch-build-time insight interface component may, in some embodiments, represent the elapsed time from the time a branch containing changes to the files, objects, and/or libraries is pushed to the code repository server, until the time the associated files, objects, and/or libraries present on the code repository server are updated, built, and tested.

The process time insight interface component may, in addition, represent the code processing period in a variety of ways. For example, in some embodiments, the code processing period related to a specific operation may be aggregated over a period of time and/or a plurality of client repository devices and/or a plurality of group shared code repositories. In some embodiments, the process time insight interface component may represent the elapsed time for a specific operation, an aggregation of operations, an aggregation of client repository devices, an aggregation of group shared code repositories, and/or the like, as an average elapsed time per developer. In some embodiments, the code processing period may be represented as a percentile of the code processing period. In other words, a process time insight interface component representing the $90^{th}$ percentile would mean that the displayed elapsed time is greater than or equal to 90 percent of the recorded times for the particular code process period. In some embodiments, the $50^{th}$ percentile, $10^{th}$ percentile, and so on may be calculated.

In some embodiments, the process time insight interface component includes a code repository object identifier to identify the associated group shared code repository. In some embodiments, an associated group shared code repository may include constituent files, libraries, and/or objects and, thus, the process time insight interface component may include multiple code repository identifiers that correlate to the associated group shared code repository and any constituent files, libraries, and/or objects. In such embodiments, the process time insight interface component may include data representing a single code processing period for the group shared code repository including an aggregation of sub-periods that are needed to process any constituent files, libraries, and/or objects. In other embodiments, the process time insight interface component may include data representing multiple code processing periods for the group shared code repository and any constituent files, libraries, and/or objects.

In some embodiments, the process time insight interface component includes a code processing operation identifier to identify a step of a code processing operation (e.g., compile time, linting time, linking time, building time) and to correlate a process time or times with the identified code processing operation.

The term "group shared code repository" refers to a database stored on a memory device which is accessible by multiple computing devices for retrieval and storage of one or more files, libraries, objects, or the like, related to program code. In some embodiments, the group shared code repository may be stored on a server remotely accessible by a computing device or on a memory device on-board the computing device. In some embodiments, the group shared code repository may perform various operations on the stored files, libraries, or objects. For example, a group shared code repository may index files, libraries, or objects upon initial upload. Indexing may allow a group shared code repository to easily search and link group shared code repository objects. In addition, a group shared code repository may perform code processing operations such as compiling, linking, and building all or parts of the group shared code repository.

The term "code process request" refers to any data construct that is generated by any network device (e.g., a client device used by a software developer) causing a code processing operation to be executed or scheduled on the group shared code repository. A code process request may be generated by any connected node on the network, for example, by a code process request module on a client repository device, by other modules or programs on a client repository device, by a connected server, by a code repository server, by a client device rendering an insight interface, by a web service, by the code processing operation monitoring module, by a hardware or software timer, or by any other authorized and connected device.

A code process request is triggered by any event for which a code processing operation may be desired. Events may include, for example, a new object added to the group shared code repository, a change to an object in the group shared code repository, a timer requiring all open files to be updated, a request to link objects of the repository to libraries or other files, a request to publish the repository or branches thereof, a request to push new changes into the repository, a request to pull files from the repository, a request to compile or build the repository, and/or other similar events. In some embodiments, a code process request indicates a code processing operation to be performed and the scope of the performed code processing operation.

The term "code processing operation" refers to any computer operation capable of being performed on a group shared code repository. In some embodiments, a code processing operation is triggered by a code process request. In other embodiments, a code processing operation may be scheduled or occur automatically. A code processing operation may include computer operations such as indexing repository objects; linting repository objects and performing other static analysis; compiling individual objects or a group of objects; linking compiled code; building applications; performing unit tests; and/or other similar operations. A code processing operation may be divided into a plurality of sub-steps. Each step of a code processing operation may be identified by a processing operation identifier. A code processing operation module may determine a process time insight interface component for a code processing operation and correlate the time with an associated processing operation identifier.

The term "code processing operation monitoring module" refers to a software application and associated hardware, and/or specifically configured circuitry, that is configured to recognize a code processing operation and identify a code processing period associated with the code processing operation. In some embodiments, the code processing operation monitoring module may be implemented on a client repository device. In some embodiments, the code processing operation monitoring module may be hosted by the same hardware device, server, database, or other apparatus as that which hosts the group shared code repository. In other embodiments, the code processing operation monitoring module may be a remote service that is disposed in electronic communication with the group shared code repository.

In some embodiments, the code processing operation monitoring module is instantiated as a plugin to a compiler (e.g., a TypeScript Compiler) or other compiler related feature. In some embodiments, the code processing operation monitoring module may be initiated in connection with other code processing processes such as, for example, code linking, code merging, publication or code release processes, code branching, indexing, and the like.

The code processing operation module may be implemented in the form of a computer program product; an entirely hardware embodiment; an entirely firmware embodiment; a combination of hardware, computer program products, and/or firmware; and/or the like. In some embodiments, the code processing operation monitoring module may override existing library functions to implement functionality required to identify a code processing period and subsequently execute deferred or delayed library functions necessary to perform the code processing operation.

In some embodiments, a code processing operation monitoring module may include a timing element that is configured to measure elapsed time associated with a code processing operation and capture such indications of such elapsed time in the form of a code processing period as discussed below. In various embodiments, the code processing operation module is configured to access and/or generate code repository object identifiers and/or code processing operation identifiers associated with the code processing operation that is being monitored. Such identifiers are then appended to or otherwise associated with any code processing period determined by the code processing operation module during such monitoring.

As one example, a code processing operation monitoring module may create and/or receive a list of every group shared code repository object identified as part of the code processing operation, determine a code processing period associated with each object, and store the list correlated to the determined code processing periods in a data array or table. As another example, a code processing operation monitoring module may be configured to create and/or receive a list of steps associated with a code processing operation, determine a code processing period associated with each step, and store the list correlated to any determined code processing periods in a data array or table.

The term "code processing period" refers to any data construct or object that is generated by the code processing operation monitoring module to represent an elapsed time associated with execution of a particular code processing operation. A code processing period may represent the elapsed time of a code processing operation or operations in a variety of units, for example, in microseconds, milliseconds, seconds, minutes, hours, and so forth. In some embodiments, a code processing period may be represented as a ratio of the elapsed processing time to a characteristic of the particular group shared code repository object or the group shared code repository as a whole. For example, a code processing period may be represented as a ratio of the elapsed time in seconds to the size of the group shared code repository object in megabytes. As another example, a code processing period may be represented as a ratio of the elapsed time in minutes to the size of the group shared repository in gigabytes.

In some embodiments, the code processing period may be represented as an average time. For example, a code processing operation monitoring module may determine the code processing period over a plurality of code process requests. The code processing period may then be represented as the average elapsed time for the particular code processing operation and/or for the particular group shared repository object or group of objects. Similarly, the code processing period may represent an aggregation of the elapsed time for a particular operation over a plurality of operation runs.

A code processing period may be determined for code processing operations associated with all or part of a group shared code repository. For example, a code processing period may represent an overall process time elapsed while performing a code processing operation on an entire group shared code repository including all files, repos, branches, libraries, or objects associated with the repository. In other embodiments, a code processing period may represent an elapsed time while performing a code processing operation on some selected subset of the group shared code repository files, repos, branches, libraries, or objects.

The term "code repository object identifier" refers to any data construct and/or unique identifier representing a group shared code repository. The code repository object identifier may be any label, name, file path, identifier, code, alphanumeric sequence, or similar computer readable label used to identify a group shared code repository. In some embodiments, a code repository identifier may be assigned to a particular group shared code repository and also to its constituent components such as, for example, any files, repos, branches, libraries, or objects associated with the repository.

In some embodiments, a code repository object identifier may be assigned at the time of object creation of the repository or at the time code or other objects are loaded into or updated within the group shared code repository. In other embodiments, a code repository object identifier may be assigned at the time a code processing operation monitoring module initiates a monitoring operation.

In some embodiments, a code repository object identifier may be provided to the code processing operation monitoring module with the code process request (e.g., appended as metadata within the code processing request). In some embodiments, the code processing operation monitoring module may generate code repository object identifiers in coordination with the execution of the code processing operation. In some embodiments, the code repository object identifiers may be generated as part of the execution of the code processing operation and returned to the code processing operation monitoring module.

The term "code processing operation identifier" refers to any data construct and/or unique identifier representing an operation capable of being performed on the group shared code repository. The code processing operation identifier may be any label, name, identifier, code, alphanumeric sequence, or similar computer readable label used to identify the group shared code repository operation.

A code processing operation identifier may be used to identify a single operation, a group of operations, a step within an operation, and so on. For example, one code processing operation identifier may identify the code base build operation and represent all of the subtasks included in the code base build. Another code processing operation identifier may identify a single subtask of the code base build operation, such as a code processing operation identifier that represents the compile stage of the code base build operation. Other similar operations may include indexing the group shared code repository; compiling the group shared code repository or individual objects on the group shared code repository; linking compiled code; building applications; performing unit tests on the group shared code repository or components of the group shared code repository; and/or other similar operations.

In some embodiments, a code processing operation identifier may be assigned at the time the code processing operation monitoring module is initialized. In some embodiments, a code processing operation identifier may be provided to the code processing operation monitoring module with the code process request (e.g., appended as metadata within the code processing request). In some embodiments, the code processing operation monitoring module may generate code processing operation identifiers in coordination with the execution of the code processing operation. In some embodiments, the code processing operation identifier may be generated as part of the execution of the code processing operation and returned to the code processing operation monitoring module (e.g., appended as metadata within the return data).

The term "code repository server" refers to a software platform and associated hardware configured to manage the various files, libraries, objects, processes, and operations associated with maintaining the one or more group shared code repositories. In some embodiments, the code repository server may further manage the functionality associated with executing the operations of the code processing operation monitoring module. The code repository server is accessible via one or more computing devices, configured to receive various requests (e.g., code process requests), and configured to manage one or more data repositories containing group shared code repository objects (e.g., group shared code repositories). The functionality of the code repository server may be provided via a single server or collection of servers having a common functionality, or the functionality of the code repository server may be segmented among a plurality of servers or collections of servers (e.g., microservices) performing subsets of the described functionality of the code repository server. In some embodiments, the code repository server may further comprise the code processing prediction machine learning module and associated functionality.

In some embodiments, the code repository server may receive and aggregate data related to code processing periods across a plurality of client repository devices and/or a plurality of group shared code repositories. Further, in some embodiments, the code repository server may generate a process time insight interface component based on the aggregated data and other received data from one or more client repository devices. In some embodiments, the code repository server may generate code processing prediction data objects based on the received and aggregated code processing periods and other data. In some embodiments, a code repository server may transmit code processing periods and other data to a code processing prediction machine learning module to generate code processing prediction data objects.

The term "insight interface" refers to a graphical user interface of a client repository device that is configured to enable a user to view and engage with one or more group shared code repository process time insight interface components. An insight interface is rendered to a display of a client device based on data and instructions embodied by the process time insight interface component as provided by the code repository server. In some embodiments, graphical representations of the data and instructions are generated by a dedicated software application running on the client repository device. In other embodiments, such graphical representations are generated by a code repository server or other network connected device, such that the graphical representations may be accessed by a client repository device through a web browser. Non-limiting examples of an insight interface include a graphical view interface presenting the user with graphical representations of the code processing period, the code processing predictions, and other relevant data. In some examples, the insight interface may provide visual representations of code processing periods associated with a total processing period, an aggregated processing period, a processing period associated with particular code repository objects as indicated by code repository object identifiers, a processing period associated with particular code processing operations as indicated by code processing operation identifiers, and other processing periods as provided by the process time insight interface component.

The term "code processing prediction data object" refers to a data construct that is generated by any network device (e.g., a code repository server) configured to describe possible outcomes related to a code processing operation. In some embodiments, the code processing prediction data object is generated by the code processing operation monitoring module based on a determined code processing period and the code repository object identifiers. In some embodiments, the code processing prediction data object is configured to correlate a change in the one or more properties associated with the code processing operations to a code repository object or a group of code repository objects, identified using the code repository object identifiers.

In some embodiments, the code processing prediction data object displays a prediction to a client repository device of the group shared code repository related to a code repository object or a group of code repository objects that are adversely affecting the performance of the code processing operation. For example, a code processing prediction data object may be generated when the code processing operation monitoring module, the code repository server, or the code processing prediction machine learning module (described below) detects or predicts a substantial increase in the code processing period.

In some embodiments, the code processing prediction data object associates a change in the code processing period with a particular file or library in the group shared code repository. The code processing prediction data object may alert a user of the client repository device that the identified file or library is adversely affecting the performance of the group shared code repository, prompting action from the user. For example, the code processing operation monitoring module may recognize an increase in the total build time for the group shared code repository, or for a subset of the files, libraries or other code objects of the group shared code repository. The code processing operation monitoring module may then identify a particular file, library, or other code object responsible for the increase in build time. The code processing operation monitoring module may then generate a code processing prediction data object, alerting the user of the offending file, library, or other code object. The user may then modify or delete the identified file, library, or other code object. In addition, the user may remove the identified file, library, or other code object from the code processing operation (e.g., default environment build).

In some embodiments, the code processing prediction data object may indicate suggestions to a developer for alternative actions to improve a predicted code processing period. For example, the code processing prediction data object may predict a code processing period (e.g., time to complete a requested build command) could be substantially improved if only a snippet of the code was rebuilt. The code processing prediction data object may indicate this recommendation to the developer.

In some embodiments, the code processing prediction data object, is transmitted to a client device via a communication network. The code processing prediction data object may be transmitted as a flag or additional metadata field in the process time insight interface component. In some embodiments, the code processing prediction data object may be transmitted to a client repository device as a separate object on the communication network. In some embodiments, the code processing prediction data object is received by the code repository server and or other network connected device, such that the alert is displayed as part of a web server and accessible by a client repository device through a web browser.

The term "code processing prediction machine learning module" refers to a data construct configured to leverage artificial intelligence in connection with the generation of a code processing prediction data object. The code processing prediction machine learning module may generate a predictive code processing score associated with the probability a particular code process request will lead to a decrease in performance of the associated code processing operation. In some embodiments, the code processing prediction machine learning module may determine a predictive code processing score based at least in part on the code process request and associated code repository object identifiers and/or code processing operation identifiers. In some embodiments, the code processing prediction machine learning module is a machine learning module comprising a neural network framework. In some embodiments, the code processing prediction machine learning module is a sequence-to-sequence (seq2seq) machine learning module. The generated predictive code processing score may be instructive in alerting a user or a client repository device to modify the code process request or associated group shared code repository prior to execution of the code processing operation. For example, if a code process request is received, requesting the group shared code repository to build the full repository, and the code processing prediction machine learning module identifies a recently added library that may substantially increase the overall build time, the code processing prediction machine learning module may generate a code processing prediction data object, warning the user of a client repository device that the added library may substantially increase the build time. The user may then elect to cancel the build request, modify the build request, remove the offending code repository object, take another action to avoid the substantial increase in build time, and/or allow the code process request to continue.

The term "code processing prediction machine learning training corpus" refers to a data construct configured to describe parameters, hyper-parameters, and/or stored operations of a code processing prediction machine learning module based at least in part on receipt of a plurality of code process requests associated with code processing operations, and further including code repository object identifiers and/or code processing operation identifiers. In some embodiments, the code processing prediction machine learning training corpus uses this input data and subsequent results of the code processing operation (e.g., code processing period) to adjust parameters associated with a code processing prediction machine learning module. In some embodiments, each training data entry includes (i) code processing operation identifiers and (2) code repository object identifiers. In some embodiments, a code processing prediction machine learning training corpus is trained using a plurality of code processing periods associated with ground-truth classification labels. In some embodiments, the code processing prediction machine learning training corpus utilizes reinforcement learning concepts to train the code processing prediction machine learning module.

System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 illustrates an example group shared code development framework 100 within which embodiments of the present disclosure may operate. The depicted group shared code development framework 100 includes a code repository server 108 configured to maintain files, libraries, objects, or the like associated with one or more code projects on one or more group shared code repositories 104a-n. The code repository server 108 of FIG. 1 is configured to interact with one or more client repository devices 110a-n via a network 102. The depicted client repository device 110a further contains a code processing operation monitoring module 106, a code process request module 118, and a display 116. The code repository server 108, as shown is further communicatively connected to a code processing prediction machine learning training corpus 114 of a code processing prediction machine learning module 112.

FIG. 1 depicts an example code repository server 108 communicatively connected to the network 102. The code repository server 108 is configured to receive code processing requests from connected client repository devices 110a-n or other connected devices requesting code process operations to be performed on files, libraries, objects, or the like contained in the one or more group shared code repositories 104a-n. In some embodiments, in response to the code process request, the code repository server 108 may initiate one or more code processing operations on the one or more group shared code repositories 104a-n. In some embodiments, the code processing requests may be routed through the code processing operation monitoring module 106 before arriving at the code repository server 108.

In addition to receiving code processing requests, a code repository server 108 may further transmit status metadata related to the operation of the one or more group shared code repositories 104a-n. Status metadata may include status of individual files (e.g., modified, checked out, up to date, etc.), the status of code projects as a whole managed on the one or more group shared code repositories 104a-n (e.g., indexing, linking, building, compiling, etc.), status of an individual group shared code repository 104 (e.g., online, offline, etc.), and/or status of the code repository server 108 as a whole. The code repository server 108, in some embodiments, may further transmit process time insight interface components based at least in part on determinations made by the code processing operation monitoring module 106 and transmitted to the code repository server 108. In some embodiments the code repository server 108 may generate instructions accompanying the data provided by the code processing operation monitoring module 106 instructing a client repository device 110 on the rendering of the process time insight interface component to an insight interface.

In some embodiments, the code repository server 108 may receive and/or accumulate data generated by one or more connected code processing operation monitoring modules 106 and transmitted to the code repository server 108 to be included in a process time insight interface component. In addition to data received from the code processing operation monitoring modules pertinent to code process periods, the code repository server 108 may further received metadata from one or more client repository devices 110 (e.g., client identifier, user identifier, request time, user role identifier, etc.). The code repository server 108 may aggregate the code processing operation monitoring module 106 data and the client repository device 110 data along with metadata received from the group shared code repositories 104 and the code processing period data accumulated by the code repository server 108 into an aggregated data repository. Accumulated data by the code repository server 108 may include code processing period data or other data across various group shared code repositories 104*a-n*; across various code projects; across various repository files, libraries, or objects; and/or across various periods of time. Data may be accumulated by the code repository server 108 to provide aggregate feedback in the process time insight interface component. For example, in some embodiments, a code repository server 108 may accumulate data across group shared code repositories 104*a-n* for an extended period of time and generate an aggregated process time insight interface component representing code processing periods for the various group shared code repositories 104*a-n* over the observed time period. In some embodiments, the code repository server 108 may accumulate data across multiple code processing operation monitoring modules 106 running on one or more client repository devices 110*a-n*. All of the accumulated and aggregated data, along with may be utilized as training data for the code processing prediction machine learning training corpus 114.

In addition, in some embodiments, the code repository server 108 may receive, generate, and/or transmit code processing prediction data objects. In some embodiments, a code repository server 108 may generate a code processing prediction data object based on one or more code processing periods received from the code processing operation monitoring module 106. In some embodiments, a code repository server 108 may receive a code processing prediction data object from a code processing operation monitoring module 106, a code processing prediction machine learning module 112, or another connected device. In some embodiments, the code repository server 108 may transmit the code processing prediction data object to a client repository device 110 or other network device capable of indicating to the user the contents of the code processing prediction data object.

The example group shared code development framework 100 of FIG. 1 further depicts one or more group shared code repositories 104*a-n* configured as a part of the code repository server 108. While depicted as an integral part of the code repository server 108, one or more of the group shared code repositories 104*a-n* may in some embodiments be implemented on a distinct apparatus or device, hardware, or circuitry from the code repository server 108 and from each other and may collectively comprise the code repository server 108. The one or more group shared code repositories 104*a-n* may provide storage of one or more files, libraries, objects, or the like, related to program code associated with a code project. A group shared code repository 104 may receive and execute code processing operations related to the development, maintenance, and storage of objects associated with a code project. Code processing operations may originate from client repository devices 110*a-n*, a code repository server 108, a code processing operation monitoring module 106, or another network connected device with permission to modify and/or manage the specific group shared code repository 104.

The example group shared code development framework 100 of FIG. 1 further depicts the code repository server 108 communicatively connected to a code processing prediction machine learning module 112. In some embodiments, the code repository server 108 may utilize a code processing prediction machine learning module 112 to generate code processing prediction data objects. The code repository server 108 may transmit code processing periods and associated code repository object identifiers and code processing operation identifiers to the code processing prediction machine learning module 112. The code processing prediction machine learning module 112 may utilize the data from the code processing operation monitoring module 106 pertinent to code process periods, along with metadata from one or more client repository devices 110 (e.g., client identifier, user identifier, request time, user role identifier, etc.), and metadata received from the group shared code repositories 104, along with data aggregated by the code repository server 108 to determine whether a code processing prediction is necessary. In some embodiments, the code processing prediction machine learning module 112 may transmit data indicating one or more code processing prediction data objects may be necessary. In some embodiments, the code repository server 108 may generate and transmit the one or more code processing prediction data objects to a user via the client repository device 110. In some embodiments, the code repository server 108 may receive data from the code processing prediction machine learning module 112 and generate and transmit the one or more code processing prediction data objects to a client repository device 110 via the network 102 connection.

A code processing prediction machine learning module 112 includes the hardware, software, firmware, and/or specifically configured circuitry to train and execute a machine learning model capable of receiving inputs related to the code processing period for a plurality of code processing operations and outputting code processing prediction data objects based on the determined outcome of the machine learning model. A code processing prediction machine learning module 112 may receive transmitted inputs from a code repository server 108, a code processing operation monitoring module 106, or another network connected device authorized to utilize the code processing prediction machine learning module 112. As depicted the code processing prediction machine learning module 112 further includes a code processing prediction machine learning training corpus 114 as an integral part of the code processing prediction machine learning module 112. However, a code processing prediction machine learning training corpus 114, in some embodiments, may be implemented on an apparatus, device, hardware, or circuitry distinct from the code processing prediction machine learning module 112. As a non-limiting example, the code processing prediction machine learning module 112 may receive as inputs code processing object identifiers, code processing operation identifiers, code processing periods, and/or other data that may be determinate in the efficient operation of the code repository server 108. In some embodiments the code processing prediction machine learning module 112 may provide code processing prediction data objects to the client repository device 110 and/or directly to the code repository server 108. In some embodiments, the code processing prediction machine learning module 112 may provide data necessary for the client repository device 110 and/or the code repository server 108 to generate and transmit a code processing prediction data object.

The code repository server 108, the client repository devices 110*a-n*, and/or the code processing prediction machine learning module 112 may be in communication using a network 102. Additionally, or alternatively, the one or more group shared code repositories 104*a-n*, the code processing operation monitoring module 106, the code processing prediction machine learning module 112, and/or the code repository server 108 may be in communication via a backend network and/or an enterprise network separate from the one or more client repository devices 110*a-n*. The network 102 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 102 (e.g., network routers, etc.). For example, the network 102 may include a cellular telephone, an 802.11, 802.16, 802.20, and/or WiMAX network. Further, the network 102 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JavaScript Object Notation (JSON) objects sent via a WebSocket channel. In some embodiments, the protocol is JSON over RPC, JSON over REST/HTTP, the like, or combinations thereof.

FIG. 1 further depicts one or more client repository devices 110*a-n*. While the client repository device 110*a*, as depicted, further includes the code processing operation monitoring module 106, in some embodiments, the functionality of the code processing operation monitoring module 106 may be contained on separate modules or devices, including partially or entirely on the code repository server 108. A client device from the one or more client repository devices 110*a-n* may include a mobile device, a smart phone, a tablet computer, a laptop computer, a wearable device, a personal computer, an enterprise computer, a virtual reality device, or another type of computing device. In one or more embodiments, a client device from the one or more client repository devices 110*a-n* may be authorized to access the code repository server 108 to view, modify, upload, download, and/or otherwise interact with files, libraries, and/or other objects. In one or more embodiments, a client device from the one or more client repository devices 110*a-n* may further access data and/or analytics related to the code repository server 108 and associated files, libraries, and/or other objects. In addition, in some embodiments, a client repository device 110*a-n* may include a display 116 capable of rendering an insight interface containing graphical representations of the data provided by the code processing operation monitoring module 106 and/or other relevant data.

As depicted in client repository device 110*a* of FIG. 1, a client repository device 110*a-n* may further include a code process request module 118. A code process request module 118 may be any module capable of capturing, generating, and/or transmitting code process requests to the code repository server 108. For example, in some embodiments, a code process request module 118 may trigger a code process request when a new object is added to the group shared code repository 104 from the client repository device 110, a change is made to a local copy of a file, object, or library managed by the group shared code repository 104, a timer requiring all open files to be updated expires, a user of the client repository device 110*a-n* requests to link objects of the repository to libraries or other files, a request is made to publish the repository or branches thereof, a request to push new changes into the repository is made, a request to pull files from the repository is made, a request to compile or build the repository is made, and/or other similar events. Code process requests generated by the code process request module 118 may additionally originate, for example, from the user of a client repository device 110*a*, the client repository device 110*a*, the code repository server 108, and/or any other network connected device.

The example embodiment of FIG. 1 further depicts an example code processing operation monitoring module 106 configured as an integral part of the client repository device 110*a*. While depicted as an integral part of the client repository device 110*a*, a code processing operation monitoring module 106 may in some embodiments be implemented on a distinct apparatus, device, hardware, or circuitry from the client repository device 110*a*, and/or on any other connected network device, such as the code repository server 108. In some embodiments, the code processing operation monitoring module 106 may be implemented as a plugin to a compiler on the client repository device 110*a*. In some embodiments, the code processing operation monitoring module 106 may intercept code processing operations transmitted by the code process request module 118 and to be performed on the code repository server 108 or elsewhere on a network connected device. The code processing operation monitoring module 106 may determine code repository object identifiers and/or code processing operation identifiers based on the code processing operation, the code processing operation source, the code processing operation destination, metadata contained in the code process request, or other similar data. The code processing operation monitoring module 106 may then perform steps necessary to execute the code process request as intended. Once complete, execution control may return to the code processing operation monitoring module 106.

The code processing operation monitoring module 106 may then terminate the code processing period and determine the overall code processing period; the code processing period for an individual group shared code repository 104 object or a group of group shared code repository 104 objects; the code processing period for various code processing operations; and/or the like. In some embodiments, the code processing operation monitoring module 106 may accumulate code process periods and other data related to the executed code processing operations, however, in some embodiments, the code repository server 108 may accumulate and determine aggregated data based on the return of a plurality of code processing operations. In some embodiments, the client repository device 110*a* may maintain execution control and utilize the functionality of the code processing operation monitoring module 106 through code processing period function calls or other requests. In such embodiments, the client repository device 110*a* may provide metadata and other identifiers to accompany such requests.

While the code processing prediction machine learning module 112 depicted in FIG. 1 is communicatively connected to the code repository server 108, in some embodiments, the code processing operation monitoring module 106 may communicate directly with the code processing prediction machine learning module 112 to generate code processing prediction data objects. A code processing operation monitoring module 106 may transmit code processing periods and associated code repository object identifiers and code processing operation identifiers to the code processing prediction machine learning module 112 to determine whether a code processing prediction is necessary. In some embodiments, the code processing operation monitoring module 106 may transmit the one or more code processing prediction data objects to a user via the client repository device 110.

The client repository device 110*a-n* may be embodied by one or more computing systems, such as the client repository device 110 illustrated in FIG. 2*a*. In one or more embodiments, the client repository device 110 may include processor 202a, memory 204a, input/output circuitry 206a, communications circuitry 208a, code processing operation monitoring circuitry 210, and code process request circuitry 212. The client repository device 110 may be configured to execute the operations described herein. Although these components 202a-212 are described with respect to functional limitations, it should be understood that the particular implementations necessarily include the use of particular hardware. It should also be understood that certain of these components 202a-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202a (and/or co-processor or any other processing circuitry assisting or otherwise associated with the processor) may be in communication with the memory 204a via a bus for passing information among components of the apparatus. The memory 204a is non-transitory and may include, for example, one or more volatile and/or non-volatile memories. In other words, for example, the memory 204a may be an electronic storage device (e.g., a computer-readable storage medium). The memory 204a may be configured to store information, data, content, applications, instructions, or the like for enabling the apparatus to carry out various functions in accordance with example embodiments of the present disclosure.

The processor 202a may be embodied in a number of different ways and may, for example, include one or more processing devices configured to perform independently. In some non-limiting embodiments, the processor 202a may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some non-limiting embodiments, the processor 202a may be configured to execute instructions stored in the memory 204a or otherwise accessible to the processor 202a. In some non-limiting embodiments, the processor 202a may be configured to execute hard-coded functionalities. As such, whether configured by hardware or software methods, or by a combination thereof, the processor 202a may represent an entity (e.g., physically embodied in circuitry) capable of performing operations according to an embodiment of the present disclosure while configured accordingly. Alternatively, as another example, when the processor 202a is embodied as an executor of software instructions, the instructions may specifically configure the processor 202a to perform the algorithms and/or operations described herein when the instructions are executed.

In some embodiments, the client repository device 110 may include input/output circuitry 206a that may, in turn, be in communication with processor 202a to provide output to the user and, in some embodiments, to receive an indication of a user input. The input/output circuitry 206a may comprise a user interface and may include a display, and may comprise a web user interface, a mobile application, a query-initiating computing device, a kiosk, or the like. In some embodiments, the input/output circuitry 206a may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204a, and/or the like).

The communications circuitry 208a may be any means such as a device or circuitry embodied in either hardware or a combination of hardware and software that is configured to receive and/or transmit data from/to a network and/or any other device, circuitry, or module in communication with the client repository device 110. In this regard, the communications circuitry 208a may include, for example, a network interface for enabling communications with a wired or wireless communication network. For example, the communications circuitry 208a may include one or more network interface cards, antennae, buses, switches, routers, modems, and supporting hardware and/or software, or any other device suitable for enabling communications via a network. Additionally or alternatively, the communications circuitry 208a may include the circuitry for interacting with the antenna/antennae to cause transmission of signals via the antenna/antennae or to handle receipt of signals received via the antenna/antennae.

The code processing operation monitoring circuitry 210 may be any means such as a device or circuitry embodied in either hardware or a combination of hardware and software that is configured to interact with one or more code processing operation monitoring modules 106. In various embodiments, the code processing operation monitoring circuitry 210 may detect code processing operation requests initiated by the code process request module 118 or another device connected to the client repository device 110a. In addition, the code processing operation monitoring circuitry 210 may determine code processing periods. Further, the code processing operation monitoring circuitry may communicate with the code repository server 108, the code processing prediction machine learning module 112, and/or other network devices utilizing the communications circuitry 208a. For example, in various embodiments, the code processing operation monitoring circuitry 210 may monitor network streams associated with the group shared code repository 104 to detect code processing operations to be monitored. Code processing operations to be monitored may be determined based on the requested code processing operation; the targeted group shared code repository 104 and/or the targeted file, library, and/or object; the metadata accompanying the code processing operation; and/or the like. The code processing operation monitoring circuitry 210 may further receive, detect, and/or analyze data returned by the group shared code repository 104 in response to code process requests. In some embodiments, the code processing operation monitoring circuitry 210 utilizes the communications circuitry 208b to transmit one or more Application Programming Interface (API) calls to one or more API servers associated with the noted client devices.

The code process request circuitry 212 may be any means such as a device or circuitry embodied in either hardware or a combination of hardware and software that is configured to interact with the code process request module 118. In one or more embodiments, the code process request circuitry 212 may generate code process requests based on user input, timer expiration, input from a network connected device, or other similar event.

The code repository server 108 may be embodied by one or more computing systems, such as the code repository server 108 illustrated in FIG. 2b. In one or more embodiments, the code repository server 108 may include processor 202*b*, memory 204*b*, input/output circuitry 206*b*, communications circuitry 208*b*, shared repository circuitry 214, and machine learning circuitry 216. The code repository server 108 may be configured to execute the operations described herein. Although these components 202*b*-208*b* and 214-216 are described with respect to functional limitations, it should be understood that the particular implementations necessarily include the use of particular hardware. It should also be understood that certain of these components 202*b*-208*b* and 214-216 may include similar or common hardware. For example, two sets of circuitries may both leverage use of the same processor, network interface, storage medium, or the like to perform their associated functions, such that duplicate hardware is not required for each set of circuitries.

In some embodiments, the processor 202*b* (and/or co-processor or any other processing circuitry assisting or otherwise associated with the processor) may be in communication with the memory 204*b* via a bus for passing information among components of the apparatus. The memory 204*b* is non-transitory and may include, for example, one or more volatile and/or non-volatile memories. In other words, for example, the memory 204*b* may be an electronic storage device (e.g., a computer-readable storage medium). The memory 204*b* may be configured to store information, data, content, applications, instructions, or the like for enabling the apparatus to carry out various functions in accordance with example embodiments of the present disclosure.

The processor 202*b* may be embodied in a number of different ways and may, for example, include one or more processing devices configured to perform independently. In some non-limiting embodiments, the processor 202*b* may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some non-limiting embodiments, the processor 202*b* may be configured to execute instructions stored in the memory 204*b* or otherwise accessible to the processor 202*b*. In some non-limiting embodiments, the processor 202*b* may be configured to execute hard-coded functionalities. As such, whether configured by hardware or software methods, or by a combination thereof, the processor 202*b* may represent an entity (e.g., physically embodied in circuitry) capable of performing operations according to an embodiment of the present disclosure while configured accordingly. Alternatively, as another example, when the processor 202*b* is embodied as an executor of software instructions, the instructions may specifically configure the processor 202*b* to perform the algorithms and/or operations described herein when the instructions are executed.

In some embodiments, the code repository server 108 may include input/output circuitry 206*b* that may, in turn, be in communication with processor 202*b* to provide output to the user and, in some embodiments, to receive an indication of a user input. The input/output circuitry 206*b* may comprise a user interface and may include a display, and may comprise a web user interface, a mobile application, a query-initiating computing device, a kiosk, or the like. In some embodiments, the input/output circuitry 206*b* may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204*b*, and/or the like).

The communications circuitry 208*b* may be any means such as a device or circuitry embodied in either hardware or a combination of hardware and software that is configured to receive and/or transmit data from/to a network and/or any other device, circuitry, or module in communication with the code repository server 108. In this regard, the communications circuitry 208*b* may include, for example, a network interface for enabling communications with a wired or wireless communication network. For example, the communications circuitry 208*b* may include one or more network interface cards, antennae, buses, switches, routers, modems, and supporting hardware and/or software, or any other device suitable for enabling communications via a network. Additionally or alternatively, the communications circuitry 208*b* may include the circuitry for interacting with the antenna/antennae to cause transmission of signals via the antenna/antennae or to handle receipt of signals received via the antenna/antennae.

The shared repository circuitry 214 may be any means such as a device or circuitry embodied in either hardware or a combination of hardware and software that is configured to interact with one or more group shared code repositories 104*a-n*. In various embodiments, the shared repository circuitry 214 may monitor, detect, and/or analyze data associated with group shared code repository 104 maintenance and operation such as, for example, code processing operations. The shared repository circuitry 214 may further receive, detect, and/or analyze data returned by the group shared code repository 104 and/or the client repository device 110*a-n* in response to code process requests. In some embodiments, the shared repository circuitry 214 utilizes the communications circuitry 208*a* to transmit one or more Application Programming Interface (API) calls to one or more API servers associated with the noted client devices.

The machine learning circuitry 216 may be any means such as a device or circuitry embodied in either hardware or a combination of hardware and software that is configured to interact with the code processing prediction machine learning module 112. In various embodiments, the machine learning circuitry 216 may be configured to interact directly with the code processing prediction machine learning training corpus 114 of the code processing prediction machine learning module 112. In one or more embodiments, the machine learning circuitry 216 may detect data based on incoming code processing requests and determined code processing periods and transmit the relevant data to the code processing prediction machine learning module 112. The machine learning circuitry 216 may further, in some embodiments, be configured to transmit code processing prediction data objects and/or data associated with code processing prediction data objects.

In some embodiments, one or more external systems (such as a remote cloud computing and/or data storage system) may also be leveraged to provide at least some of the functionality discussed herein.

FIG. 3 illustrates a signal diagram of an example code process request and subsequent system communication. As depicted in the example embodiment of FIG. 3, a code process request 302 is initiated by the code process request module 118. The code process request 302 may be triggered, for example, by a timer on a client repository device 110 authorized to modify a group shared code repository 104, requesting that all open files be updated.

As further illustrated in FIG. 3, the code processing operation monitoring module 106 receives the code process request 302. In some embodiments, the code processing operation monitoring module 106, for example, may intercept the code process request 302 by overriding the library functionality of the intended target of the code process request 302. The code processing operation monitoring module 106 then transmits the code processing operation 304 to the group shared code repository 104. In some embodiments, the code processing operation monitoring module 106 may decode and analyze data and metadata associated with the code process request 302 to initialize determination of the code processing period and to initialize data structures associated with the creation of the process time insight interface component. For example, a code processing operation monitoring module 106 may start a timer to determine the overall processing time for a particular code processing operation. A code processing operation monitoring module 106 may also create data structures as place holders for the relevant data once the code processing operation has completed and control returns to the code processing operation monitoring module 106.

As further illustrated in the example embodiment of FIG. 3, the code processing operation monitoring module 106 transmits the code processing operation to the intended group shared code repository 104. Upon receipt, completion, rejection, and/or failure of the transmitted code processing operation by the group shared code repository 104, a response to the code processing operation request (e.g., code process operation response message 306) is transmitted from the group shared code repository 104 to the code processing operation monitoring module 106. As depicted in the example embodiment of FIG. 3, the process time insight interface component is finalized based on the determination of the code processing period(s) and transmitted (308) to the client repository device 110. After receiving the process time insight interface component, the client repository device 110 may utilize a display 116 to present the process time insight interface component on an insight interface to the user. While in the depicted embodiment, the process time insight interface component is sent from the code pressing operation monitoring module 106, in some embodiments, the code repository server 108 may aggregate data and/or receive code processing periods and generate the process time insight interface component. In such an embodiment, the code repository server 108 would generate and transmit the process time insight interface component to the client repository device 110.

As further depicted in the example embodiment of FIG. 3, a code processing operation monitoring module 106 may optionally transmit relevant data (e.g., a plurality of code processing periods 312, code repository object identifiers, code processing operation identifiers, etc.) to a code processing prediction machine learning module 112. The code processing prediction machine learning module 112 may determine if a code processing prediction data object is necessary based on the input data. As depicted in the example embodiment of FIG. 3, a code processing prediction data object is transmitted from the code processing prediction machine learning module 112 to the code processing operation monitoring module 106.

As further depicted in FIG. 3, in the example embodiment, the code processing prediction data object is transmitted from the code processing operation monitoring module 106 to the client repository device 110 (e.g., code processing prediction data object 314), notifying the client repository device 110 of a potential issue related to the efficiency of the code process request. For example, the code processing prediction data object may indicate that the code process request related to a particular library will require a significant amount of time to complete.

As indicated by the example embodiment depicted in FIG. 3, the code processing prediction data object 314 may be transmitted to the client repository device 110 in an embodiment in which a code processing prediction machine learning module 112 is not utilized. In such an embodiment, the code processing operation monitoring module 106, code repository server 108, and/or other network connected device may determine a code processing prediction data object is necessary to alert the client repository device 110 of a potential issue with the efficiency of the code process request 302. In such an instance, the code processing operation monitoring module 106 transmits a code processing prediction data object 314 to the client repository device 110.

FIG. 4 is a flowchart diagram of an example process 400 for determining a process time insight interface component and optionally determining and transmitting a code processing prediction data object.

The process 400 begins at operation 402, when a client repository device 110 detects a code process request triggering a code processing operation associated with a group shared code repository 104. A client repository device 110 may detect a code process request based on the data or associated metadata accompanying a code process request. For example, a flag, heading, title, name, alphanumeric sequence, and/or other similar structure may indicate the triggering event, the code processing operation, the target file/object, and/or other similar data indicating a code processing operation should be tracked. In some embodiments, a client repository device 110 may detect a code process request triggering a code processing operation by overriding a called library function, re-routing all requests intended for a particular library function to the overriding function. For example, a client repository device 110 may override an update function associated with the code repository server 108. When subsequent calls are made to the update function, processing control will be passed to the overriding function as opposed to the library function, allowing the overriding function to analyze the environment before the specific library function is initiated and regaining execution control once the library function has finished. In some embodiments, the overriding function may also comprise the functionality of the code processing operation monitoring module 106.

At operation 404, the process 400 continues when the client repository device 110 initiates a code processing operation monitoring module 106 to identify a code processing period associated with the code processing operation. Proximate to the start of the identified code processing operation, the code processing operation monitoring module 106 may initialize a clock, record the system time, and/or record other system data. For example, a code processing operation monitoring module 106 may start a system clock when the code processing operation is initiated.

At operation 406, the process 400 continues when the client repository device 110 receives the process time insight interface component generated based on the code processing period. A code processing operation monitoring module 106 may ensure control is passed back to the code processing operation monitoring module 106 after completion of the code processing operation. For example, a code processing operation monitoring module 106 may override a library function and call the library function from within a function wrapper, such that processing control will return to the overriding function once the library function terminates. Alternatively, the code processing operation monitoring module 106 could register a callback function that is called upon completion of the code processing operation. Upon completion of the code processing operation, the code processing operation monitoring module 106 may compare the initial system data with the system data upon completion. For example, a code processing operation monitoring module 106 may start a system clock when the code processing operation is initiated. Once the code processing operation completes the system clock is stopped and the overall duration of the code processing operation may be determined by comparing the end system time with the start system time. In some embodiments, the client repository device 110 may transmit the data related to the code processing period to a code repository server 108 or other network connected device. The code repository server 108 and/or other network connected device may aggregate the received data across one or more client repository devices 110 and/or group shared code repositories. For example, if data is aggregated over time, or across a plurality of client repository devices 110 and/or a plurality of group shared code repositories 104, the code repository server 108 may collect and aggregate the data provided by the code processing operation monitoring module 106. Once data is collected, the client repository device may initiate a determination of the process time insight interface component and/or the code repository server 108 may determine and generate the process time insight interface component.

At operation 408, the process 400 continues when the client repository device 110 renders the process time insight interface component to an insight interface associated with the group shared code repository 104. A code repository server 108, upon determination of the process time insight interface component may transmit the insight interface component to the client repository device 110. The client repository device 110 may then utilize the display 116 to render the process time insight interface component (e.g., 502, 602) on an insight interface display (e.g., 500, 600).

At operation 410, the process 400 optionally continues when the client repository device 110 and/or the code repository server 108 initiates the transmission of a plurality of code processing periods associated with a one or more code processing operation identifiers to a code processing prediction machine learning training corpus 114 of a code processing prediction machine learning module 112. In some embodiments, the group shared code development framework 100 may further include a code processing prediction machine learning module 112, capable of receiving input data related to the code processing operation and target code repository objects and determining whether a code processing prediction data object should be generated. In such embodiments, a code processing prediction machine learning module 112 may include a code processing prediction machine learning training corpus 114 which may be trained to determine if a code processing prediction data object is necessary based on, for example, a substantial increase in the overall code processing period. In some embodiments, the client repository device 110 and/or the code repository server may transmit or initiate transmission of calculated or aggregated code processing periods to the code processing prediction machine learning module 112.

At operation 412, the process 400 continues when the client repository device 110 receives a code processing prediction data object based at least in part on the code processing period. In some embodiments, a client repository device 110, a code processing operation monitoring module 106, and/or a code repository server 108 may determine whether a code processing prediction data object should be generated based on data including but not limited to the code processing period(s), code repository object identifiers, code processing operation identifiers, and/or the like. In some embodiments, a code processing prediction machine learning module 112 may determine whether a code processing prediction data object should be generated.

At operation 414, the process 400 concludes when the client repository device 110 outputs the code processing prediction data object to the insight interface associated with the group shared code repository 104. Whether generated by the client repository device 110, the code processing operation monitoring module 106, the code repository server 108, and/or the code processing prediction machine learning module 112, a generated alert data object may be transmitted to the client repository device 110 or other connected device. The code processing prediction data object may be represented graphically on the display 116 of a client repository device 110. In some embodiments, the code processing prediction data object may trigger a user interface to seek user approval before executing the code processing operation. For example, if a code processing prediction data object predicts that a particular library may take a significant amount of time to compile, the client repository device 110, may be prompted to query whether the user wishes to proceed with the code processing operation, abort the code processing operation, or perhaps even skip the particular library. The group shared code development framework 100 may then proceed based on the user feedback.

Referring now to FIG. 5, an example insight interface display 500 is presented in accordance with one or more embodiments of the present disclosure. The insight interface display 500 can be, for example, an electronic interface (e.g., a graphical user interface) of a client device (e.g., the client repository devices 110a-n). In one or more embodiments, the insight interface display 500 may include a process time insight interface component 502a-c for a particular group shared code repository 104. In the depicted embodiment of FIG. 5, the process time insight interface components 502a-c are presented in a bar graph format, however, the process time insight interface component 502 may be presented on the insight interface in any format including but not limited to pie charts, line graphs, text, table, and/or the like.

As depicted in FIG. 5, the insight interface components 502a-c depict a type-system-setup-time insight interface component which displays the type system setup time (e.g., the time to prepare and open a file for the developer to edit) in various data formats. For example, insight interface component 502a displays the code processing period as a calculated percentile over an aggregated period (e.g., one week). More specifically, the process time insight interface component 502a represents the $90^{th}$ percentile of type system setup times, meaning the displayed elapsed time is greater than or equal to 90 percent of the recorded times for the particular code process period. As another example, insight interface component 502b presents the type system setup time as a per developer time aggregated over a time period (e.g., one week). In other words, the aggregated type system setup time may be aggregated over a time period and then divided by the number of developers and may be output on an insight interface display 500. As a third example, process time insight interface component 502c displays the type system setup time as a total time in hours over an aggregated period (e.g., one week). In other words, the total time may be aggregated for each client repository device 110, each developer, and/or each group shared code repository 104 and displayed as a total time spent waiting for a programming types to be created upon opening of a file.

Referring now to FIG. 6, another example insight interface display 600 is presented in accordance with one or more embodiments of the present disclosure. As depicted in FIG. 6, the insight interface components in row 602*a* depict an aggregated time including the type system setup time, the code change to build time, and the branch build time. In some embodiments, these and similar times may be aggregated, or summed, to show the total time developers spend waiting over a combination of certain code processing operations. The insight interface components in row 602*b* depict a code-change-to-build-time insight interface component which represents the elapsed time from the time a developer makes a change to a file, object, and/or library on a group shared code repository 104 until the corresponding files, objects, and/or libraries have been updated and built, such that the code is ready for testing and/or deployment. The insight interface components in row 602*c* depict a branch-build-time insight interface component which may represent the elapsed time from the time a branch containing changes to the files, objects, and/or libraries is pushed to the code repository server 108, until the time the associated files, objects, and/or libraries present on the code repository server 108 are updated, built, and tested.

In one or more embodiments, the insight interface display 500 facilitates user interface navigation and/or interaction with selection menus allowing a user to select the data and format for display, pop-up queries soliciting user feedback, and the like.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus configured for generating a process time insight interface component associated with a group shared code repository, the apparatus comprising at least one processor and at least one memory including program code, the at least one memory and the program code configured to, with the at least one processor, cause the apparatus to at least:

intercept, at a code processing operation monitoring module, a code process request initiated by a client repository device, wherein the code process request is configured to trigger a code processing operation associated with a first code processing operation identifier to be executed on the group shared code repository, wherein the first code processing operation identifier identifies the code processing operation;

initiate, at the code processing operation monitoring module, a code processing period comprising the first code processing operation identifier, wherein initiating the code processing period comprises at least initializing a timer;

trigger the code processing operation associated with the first code processing operation identifier to execute on the group shared code repository;

receive, from the group shared code repository at the code processing operation monitoring module, a code process operation response indicating completion of the code processing operation;

determine, at the code processing operation monitoring module, an elapsed time associated with the code processing operation based on the code process operation response and the timer;

record the elapsed time in the code processing period comprising the first code processing operation identifier;

intercept, at the code processing operation monitoring module, a second code process request initiated by a second client repository device, wherein the second code process request is configured to trigger a second code processing operation associated with a second code processing operation identifier to be executed on the group shared code repository, and wherein the second code processing operation identifier identifies the second code processing operation;

receive, from the group shared code repository at the code processing operation monitoring module, a second code process operation response indicating completion of the second code processing operation;

determine, at the code processing operation monitoring module, a second elapsed time associated with the second code processing operation based on the second code process operation response;

determine the code processing operation associated with the code process request is equivalent to the second code processing operation associated with the second code process request by comparing the first code processing operation identifier and the second code processing operation identifier;

aggregate the second elapsed time with the elapsed time in the code processing period comprising the first code processing operation identifier; and generate the process time insight interface component based on the code processing period.

2. The apparatus of claim 1, wherein the code processing operation comprises compiling all or part of the group shared code repository, recompiling all or part of the group shared code repository, indexing all or part of the group shared code repository, and/or any combination thereof.

3. The apparatus of claim 1, the at least one memory and the program code configured to, with the at least one processor, cause the apparatus to at least:

cause the process time insight interface component to render to an insight interface associated with the group shared code repository a graphical representation of the aggregated code processing period.

4. The apparatus of claim 3, wherein a code processing prediction data object is generated based at least in part on the code processing period and output to the insight interface associated with the group shared code repository.

5. The apparatus of claim 4, wherein the code processing prediction data object identifies one or more adverse code repository object identifiers and/or adverse code processing operation identifiers adversely affecting system performance, wherein the code processing prediction data object causes an alert to be rendered to the insight interface, and wherein the code processing prediction data object recommends one or more alternative actions associated with at least one of the one or more adverse code repository object identifiers or adverse code processing operation identifiers.

6. The apparatus of claim 4, wherein the code processing prediction data object is determined based at least in part on the output of a code processing prediction machine learning module comprising a code processing prediction machine learning training corpus trained with a plurality of code processing periods associated with a plurality of code repository object identifiers and/or code processing operation identifiers.

7. The apparatus of claim 1, wherein the process time insight interface component comprises a code-change-to-build-time insight interface component, a type-system-setup-time insight interface component, and/or a branch-build-time insight interface component.

8. A method for rendering a process time insight interface component in a group shared code repository, method comprising:

intercepting, at a code processing operation monitoring module, a code process request initiated by a client repository device, wherein the code process request is configured to trigger a code processing operation associated with a first code processing operation identifier to be executed on the group shared code repository, wherein the first code processing operation identifier identifies the code processing operation;

initiating, at the code processing operation monitoring module a code processing period comprising the first code processing operation identifier, wherein initiating the code processing period comprises at least initializing a timer;

trigger the code processing operation associated with the first code processing operation identifier to execute on the group shared code repository;

receiving, from the group shared code repository at the code processing operation monitoring module, a code process operation response indicating completion of the code processing operation;

determining, at the code processing operation monitoring module, an elapsed time associated with the code processing operation based on the code process operation response and the timer;

recording the elapsed time in the code processing period comprising the first code processing operation identifier;

intercepting, at the code processing operation monitoring module, a second code process request initiated by a second client repository device, wherein the second code process request is configured to trigger a second code processing operation associated with a second code processing operation identifier to be executed on the group shared code repository, and wherein the second code processing operation identifier identifies the second code processing operation;

receiving, from the group shared code repository at the code processing operation monitoring module, a second code process operation response indicating completion of the second code processing operation;

determining, at the code processing operation monitoring module, a second elapsed time associated with the second code processing operation based on the second code process operation response;

determining the code processing operation associated with the code process request is equivalent to the second code processing operation associated with the second code process request by comparing the first code processing operation identifier and the second code processing operation identifier;

aggregating the second elapsed time with the elapsed time in the code processing period comprising the first code processing operation identifier; and generating the process time insight interface component based on the code processing period.

9. The method of claim 8, wherein the code processing operation further comprises compiling all or part of the group shared code repository, recompiling all or part of the group shared code repository, indexing all or part of the group shared code repository, and/or any combination thereof.

10. The method of claim 8, further comprising:

causing the process time insight interface component to render to an insight interface associated with the group shared code repository a graphical representation of the aggregated code processing period.

11. The method of claim 10, wherein a code processing prediction data object is generated based at least in part on the code processing period, and output to the insight interface associated with the group shared code repository.

12. The method of claim 11, wherein the code processing prediction data object identifies one or more code repository object identifiers and/or code processing operation identifiers adversely affecting system performance, wherein the code processing prediction data object causes an alert to be rendered to the insight interface, and wherein the code processing prediction data object recommends one or more alternative actions associated with at least one of the one or more code repository object identifiers or code processing operation identifiers.

13. The method of claim 11, wherein the code processing prediction data object is determined based at least in part on an output of a code processing prediction machine learning module comprising a code processing prediction machine learning training corpus trained with a plurality of code processing periods associated with a plurality of code repository object identifiers and/or code processing operation identifiers.

14. A computer program product for rendering a process time insight interface component in a group shared code repository, the computer program product comprising at least one non-transitory computer-readable storage medium having computer-readable program code portions stored therein, the computer-readable program code portions comprising an executable portion configured to:

intercept, at a code processing operation monitoring module, a code process request initiated by a client repository device, wherein the code process request is configured to trigger a code processing operation associated with a first code processing operation identifier to be executed on the group shared code repository, wherein the first code processing operation identifier identifies the code processing operation;

initiate, at the code processing operation monitoring module, a code processing period comprising the first code processing operation identifier, wherein to initiate the code processing period comprises at least initializing a timer;

trigger the code processing operation associated with the first code processing operation identifier to execute on the group shared code repository;

receive, from the group shared code repository at the code processing operation monitoring module, a code process operation response indicating completion of the code processing operation;

determine, at the code processing operation monitoring module, an elapsed time associated with the code processing operation based on the code process operation response and the timer;

record the elapsed time in the code processing period comprising the first code processing operation identifier;

intercept, at the code processing operation monitoring module, a second code process request initiated by a second client repository device, wherein the second code process request is configured to trigger a second code processing operation associated with a second code processing operation identifier to be executed on the group shared code repository, and wherein the second code processing operation identifier identifies the second code processing operation;

receive, from the group shared code repository at the code processing monitoring module, a second code process operation response indicating completion of the second code processing operation;

determine, at the code processing operation monitoring module, a second elapsed time associated with the second code processing operation based on the second code process operation response;

determine the code processing operation associated with the code process request is equivalent to the second code processing operation associated with the second code process request by comparing the first code processing operation identifier and the second code processing operation identifier;

aggregate the second elapsed time with the elapsed time in the code processing period comprising the first code processing operation identifier; and generate the process time insight interface component based on the code processing period.

15. The computer program product of claim 14, wherein the code processing operation further comprises compiling all or part of the group shared code repository, recompiling all or part of the group shared code repository, indexing all or part of the group shared code repository, and/or any combination thereof.

16. The computer program product of claim 14, the executable portion further configured to:

cause the process time insight interface component to render to an insight interface associated with the group shared code repository a graphical representation of the aggregated code processing period.

17. The computer program product of claim 16, wherein a code processing prediction data object is generated based at least in part on the code processing period and output to the insight interface associated with the group shared code repository.

18. The computer program product of claim 17, wherein the code processing prediction data object identifies one or more code repository object identifiers and/or code processing operation identifiers adversely affecting system performance, wherein the code processing prediction data object causes an alert to be rendered to the insight interface, and wherein the code processing prediction data object recommends one or more alternative actions associated with at least one of the one or more code repository object identifiers or code processing operation identifiers.

19. The computer program product of claim 17, wherein the code processing prediction data object is determined based at least in part on an output of a code processing prediction machine learning module comprising a code processing prediction machine learning training corpus trained with a plurality of code processing periods associated with a plurality of code repository object identifiers and/or code processing operation identifiers.

* * * * *